United States Patent
Chen et al.

(10) Patent No.: US 9,269,130 B2
(45) Date of Patent: Feb. 23, 2016

(54) IMAGE CORRECTION METHOD USING APPROXIMATELY NON-LINEAR REGRESSION APPROACH AND RELATED IMAGE CORRECTION CIRCUIT

(71) Applicant: Realtek Semiconductor Corp., HsinChu (TW)

(72) Inventors: Shih-Tse Chen, Hsinchu County (TW); Hao-Tien Chiang, Taipei (TW)

(73) Assignee: Realtek Semiconductor Corp., Science Park, HsinChu (TW)

( * ) Notice: Subject to any disclaimer, the term of this patent is extended or adjusted under 35 U.S.C. 154(b) by 192 days.

(21) Appl. No.: 13/858,101

(22) Filed: Apr. 8, 2013

(65) Prior Publication Data

US 2014/0193079 A1    Jul. 10, 2014

(30) Foreign Application Priority Data

Jan. 10, 2013    (TW) .............................. 102100886 A

(51) Int. Cl.
*G06T 5/00* (2006.01)

(52) U.S. Cl.
CPC ...................................... *G06T 5/006* (2013.01)

(58) Field of Classification Search
USPC ......................................... 382/275, 276, 293
See application file for complete search history.

(56) References Cited

U.S. PATENT DOCUMENTS

| | | | | |
|---|---|---|---|---|
| 7,813,585 | B2 * | 10/2010 | Higurashi et al. | 382/275 |
| 8,446,678 | B2 * | 5/2013 | Mihara | 359/676 |
| 8,768,094 | B2 * | 7/2014 | Bassi et al. | 382/275 |
| 9,013,803 | B2 * | 4/2015 | Morooka | 359/684 |
| 9,053,530 | B2 * | 6/2015 | Kokemohr | |
| 2004/0109615 | A1 * | 6/2004 | Nakamura | 382/317 |
| 2007/0160360 | A1 * | 7/2007 | Mowry | 396/311 |
| 2015/0086132 | A1 * | 3/2015 | Tsukagoshi | 382/275 |

FOREIGN PATENT DOCUMENTS

| | | |
|---|---|---|
| TW | 200908731 | 2/2009 |
| TW | 201044322 | 12/2010 |
| TW | 201220251 | 5/2012 |

* cited by examiner

*Primary Examiner* — Ishrat I Sherali
(74) *Attorney, Agent, or Firm* — Winston Hsu; Scott Margo

(57) ABSTRACT

An image correction method arranged for processing an original image to obtain a corrected image includes steps: receiving the original image from an image sensor; regarding each pixel of the original image, calculating a horizontal distance and a vertical distance between the pixel and a reference point in the original image; determining a horizontal ratio parameter and a vertical ratio parameter according to the horizontal distance and the vertical distance between the pixel and the reference point in the original image; and performing an approximately non-linear regression calculation on the horizontal ratio parameter, the vertical ratio parameter and a coordinate of the pixel to obtain a position of the pixel in the corrected image.

12 Claims, 10 Drawing Sheets

IMAGE CORRECTION METHOD USING APPROXIMATELY NON-LINEAR REGRESSION APPROACH AND RELATED IMAGE CORRECTION CIRCUIT

BACKGROUND OF THE INVENTION

1. Field of the Invention

The disclosed embodiments of the present invention relate to image correction, and more particularly, to an image correction method using an approximately non-linear regression approach to correct the captured images and a related image correction circuit.

2. Description of the Prior Art

When a fish-eye lens or a wide-angle lens is used to capture images, although the captured images have a very wide-angle view, a barrel-shaped distortion often happens as shown in FIG. 1A, which will affect the image quality. In addition, when using a long lens or a telephoto lens to capture images, although it can capture images in the long distance, a pillow-shaped distortion often happens as shown in FIG. 1B.

Therefore, in order to address this problem, this kind of images will be processed with digital image correction operations such that the distorted images may be recovered to the original state. Generally speaking, digital image correction operations may be roughly divided into two categories. The first type uses de-warping transformation mathematical models to perform image correction operations. This kind of correction method inducts a mapping mechanism from a three-dimensional (3D) space to a two-dimensional (2D) space according to optics and lens characteristics, so as to restore images with barrel-shaped distortion to their original states. However, this kind of method has some disadvantages. First, a viewing angle is compromised, especially horizontal field of view (FOV). The wider is the viewing angle of the lens, the more horizontal FOV is lost after the image correction operations. If it is a wide-angle lens with about 170-degree viewing angle, the wide-angle lens may lose approximately 30-degree viewing angle after the image correction operations. Although the remaining viewing angle is still wider than a normal lens (a normal lens generally has a viewing angle which is roughly 50-60 degrees), it significantly cripples capabilities of the wide-angle lens and somehow loses the "meaning" of using the wide-angle lens. In addition, although it may increase the viewing angle when performing image correction operations by a technique of shrinking an image, it will cause the corrected image to be much smaller than the original image. In addition, using such mathematical models for image correction may often cause the image to be overly stretched around the rims of the image, which may seem unnatural. Besides, the wider is the viewing angle, the more significant the stretch is. Therefore this method is unsuitable for super wide-angle lens. Moreover, this kind of correction method has high complexity calculations, which involves calculations of many triangular functions and their inverse functions, and will greatly increase difficulties in hardware implementation. Even if the mapping mechanism is pre-computed by software, it will cause an unnatural freeze image in the beginning. Finally, this method is only practical to address the barrel-shaped distortion. If the image correction is to deal with a pillow-shaped distortion caused by a telephoto lens, another mathematical model must be inducted, and the calculation and the physical meaning will be accordingly different. As a result, this method is not generalized enough.

The second type uses a known input image and an output image derived from capturing the known input image to calculate coefficients of a polynomial used to perform image correction operations. That is, this method uses a lot pre-configured coordinates to calculate correspondences of the known input image and the output image, in order to obtain each coefficient of a high-order polynomial for using the polynomial to perform the image correction operations on the images. However, this method has some disadvantages, either. First, the coordinates of the input image and the corresponding coordinates of the captured output image have to be acquired manually and then substituted into the polynomial. It is extremely complicated to obtain these coefficients, and there are quite a lot coefficients needed to be obtained, leading to many inconveniences in performing image correction operations. If the lens is changed, these steps have to be repeated again. In addition, when applied to a super wide-angle lens, this method cannot achieve a very good effect. The reason is that when the horizontal FOV is near 170 degree, it is very hard for the known image to cover the whole view, and the calculation errors would be huge. Besides, this method cannot guarantee to hold the horizontal FOV, which cripples capabilities of the wide-angle lens and loses the "meaning" of using the wide-angle lens as well.

SUMMARY OF THE INVENTION

In accordance with exemplary embodiments of the present invention, an image correction method using an approximately non-linear regression approach and a related image correction circuit are proposed to solve the above-mentioned problem. The image correction method and related image correction circuit have the advantages such as fast and accurate image correction, low cost, horizontal FOV preservation, and easy hardware implementation.

According to a first aspect of the present invention, an exemplary image correction method is disclosed. The exemplary image correction method arranged for processing an original image to obtain a corrected image includes steps: receiving the original image from an image sensor; regarding each pixel of the original images, calculating a horizontal distance and a vertical distance between the pixel and a reference point in the original image; determining a horizontal ratio parameter and a vertical ratio parameter according to horizontal distance and a vertical distance between the pixel and the reference point in the original image; and performing an approximately non-linear regression calculation on the horizontal ratio parameter, the vertical ratio parameter and a coordinates of the pixel to obtain a corrected position of the pixel in the corrected image.

According to a second aspect of the present invention, an exemplary image correction circuit is disclosed. The exemplary image correction circuit arranged for processing an original image to obtain a corrected image includes a distance calculation unit, a ratio parameter determining unit, and an approximately non-linear regression adjustment unit. Regarding each pixel of the original images, the distance calculation unit is arranged for calculating a horizontal distance and a vertical distance between the pixel and a reference point in the original image. The ratio parameter determining unit is coupled to the distance calculation unit, and arranged for determining a horizontal ratio parameter and a vertical ratio parameter according to horizontal distance and a vertical distance between the pixel and the reference point in the original image. The approximately non-linear regression adjustment unit is coupled to the ratio parameter determining unit, and arranged for performing an approximately non-linear regression calculation on the horizontal ratio parameter, the vertical ratio parameter and a coordinates of the pixel to obtain a corrected position of the pixel in the corrected image.

These and other objectives of the present invention will no doubt become obvious to those of ordinary skill in the art after reading the following detailed description of the preferred embodiment that is illustrated in the various figures and drawings.

DETAILED DESCRIPTION

Figure 1A:
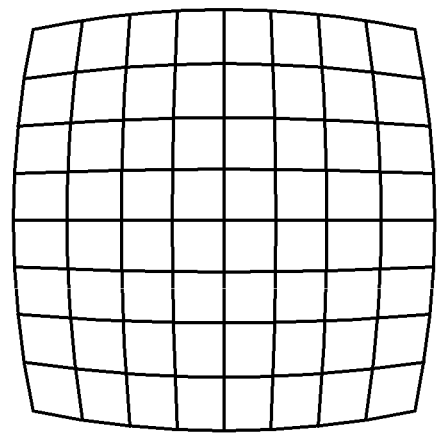
FIG. 1A is an example illustrating a barrel-shaped distortion according to the prior art.
Figure 1A:
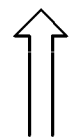
Figure 1A:
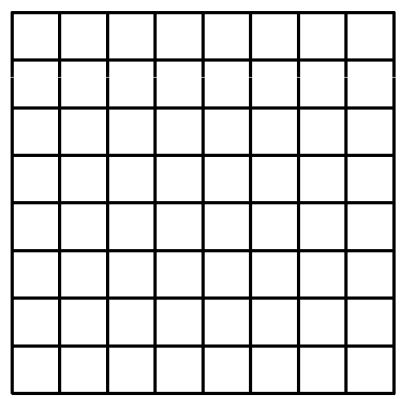
Figure 1B:
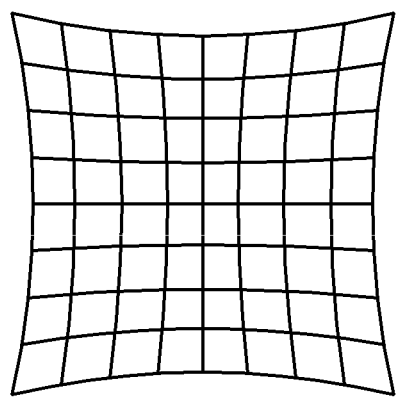
FIG. 1B is an example illustrating a pillow-shaped distortion according to the prior art.
Figure 1B:
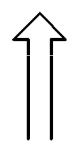
Figure 1B:
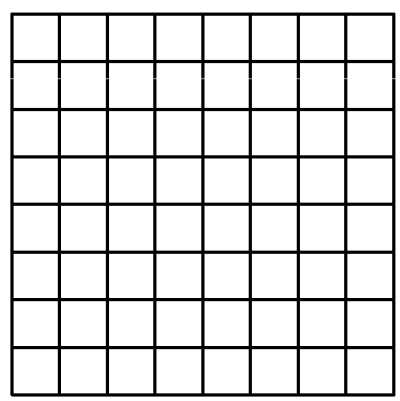
Figure 2:
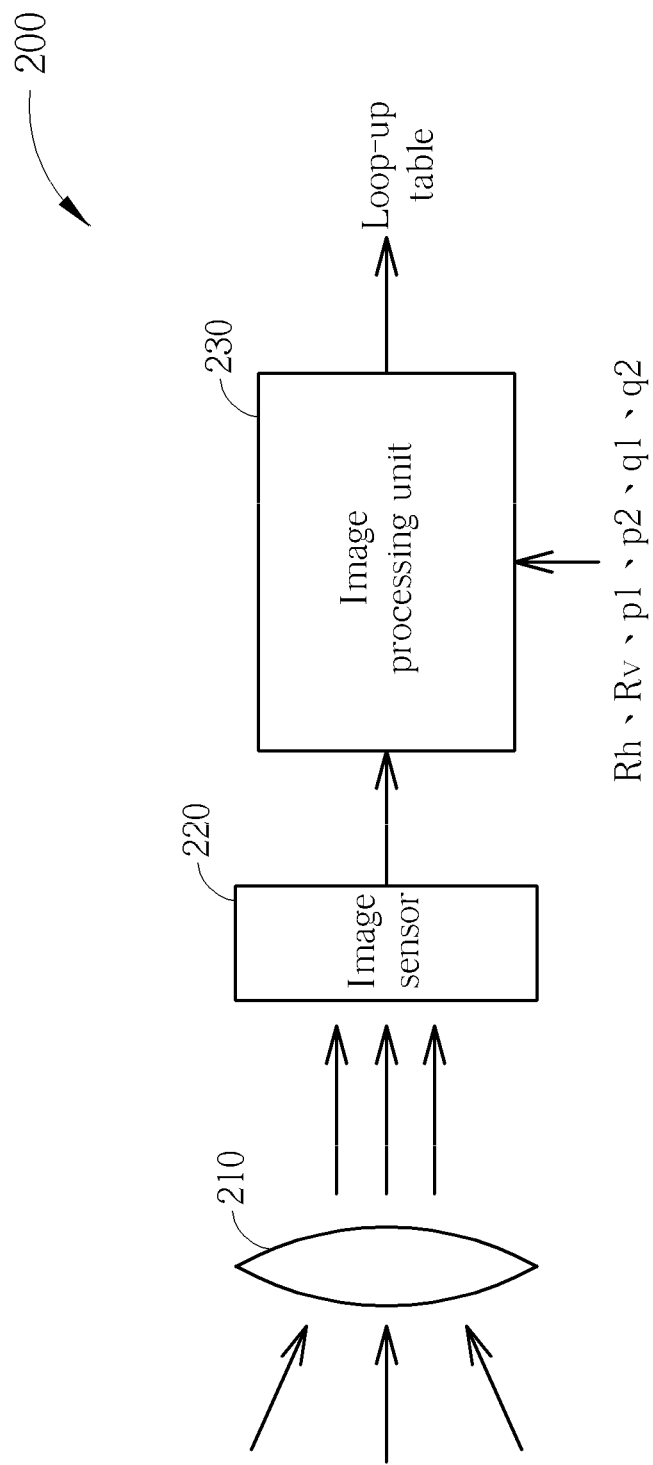
FIG. 2 is a schematic diagram illustrating an image correction system according to an embodiment of the present invention.

Please refer to FIG. 2, which is a schematic diagram illustrating an image correction system 200 according to an embodiment of the present invention. As shown in FIG. 2, the image correction system 200 includes a lens 210, an image sensor 220 and an image processing unit 230. The lens 210 is a wide-angle lens or telephoto lens. Operations of the image correction system 200 are performed off-line for establishing a look-up table to be used by an image capture/record device equipped with a lens of the same model/specification of the lens 210. The look-up table may be used to perform image correction operations on captured images to mitigate barrel-shaped distortion or pillow-shaped distortion. In addition, in this embodiment, the image processing unit 230 may be realized by software or hardware, i.e., the following operations of the image processing unit 230 may be realized by a central processing unit (CPU) executing program codes, or may be realized by a hardware circuit.

Figure 3:
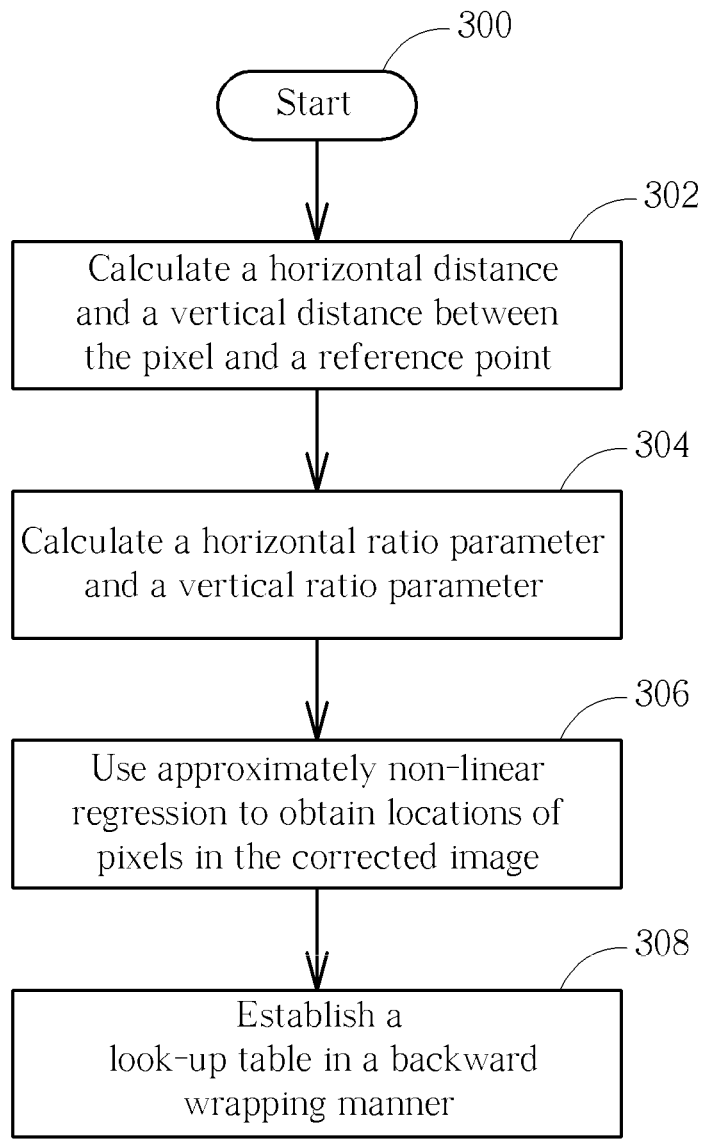
FIG. 3 is a flowchart illustrating an image correction method according to an embodiment of the present invention.

Please concurrently refer to FIG. 2 and FIG. 3. FIG. 3 is a flowchart illustrating an image correction method according to an embodiment of the present invention. The process shown in FIG. 3 is described as follows.

Figure 4:
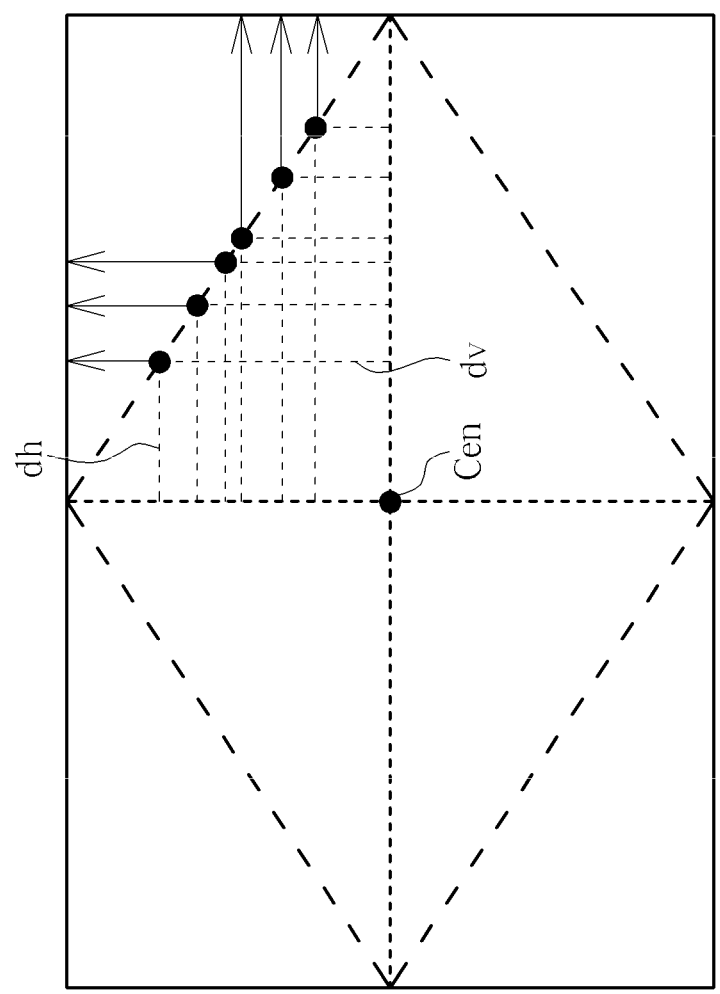
FIG. 4 is a schematic diagram illustrating operations of an image correction system according to an embodiment of the present invention.

First, in step 300, the process starts. Hence, an engineer uses the image correction system 200 to record/capture a sample with a specific pattern. In step 302, the image processing unit 230 receives an original image data from image sensor 220. Next, please refer to FIG. 4. Regarding each pixel of the original image data, the image processing unit 230 calculates a horizontal distance and a vertical distance between the pixel and a reference point Cen. As shown in FIG. 4, in this embodiment, the reference point Cen is a center point of the original image data.

Next, in step 304, the image processing unit 230 calculates a horizontal ratio parameter Wh and a vertical ratio parameter Wv according to the horizontal distance and the vertical distance between the pixel and the reference point Cen calculated in step 302. The horizontal ratio parameter Wh and the vertical ratio parameter Wv represent the degrees of the pixel stretching outwards in horizontal direction and vertical direction, respectively. For example, horizontal ratio parameter Wh and the vertical ratio parameter Wv may be calculated in the following manner, respectively: $Wh=(\alpha dv+k1)$ and $Wv=(\beta dh+k2)$, where dh and dv are the horizontal distance and the vertical distance between the pixel and the reference point Cen, respectively, $\alpha$ and $\beta$ may be any positive/negative constants that are appropriate, and k1 and k2 are also constants. In one embodiment, the horizontal ratio parameter Wh is in proportion to the vertical distance between the pixel and the reference point Cen, and the vertical ratio parameter Wv is in proportion to the horizontal distance between the pixel and the reference point Cen. That is, $k1=0$ and $k2=0$ in above-mentioned formula. In another embodiment, the horizontal ratio parameter Wh is equal to the vertical distance between the pixel and the reference point Cen, and the vertical ratio parameter Wv is equal to the horizontal distance between the pixel and the reference point Cen. That is, $k1=0$, $k2=0$, $\alpha=1$, and $\beta=1$ in above-mentioned formula. In other words, it is assumed that a diamond area enclosed by dotted line is an area ready to be stretched and restored, and areas other than the diamond area are no longer needed after performing the image correction operations (i.e., it is assumed that the distorted image is presented in a diamond shape), as shown in FIG. 4. Since the diamond area formed by the dotted line is ready to be stretched in order to conform to rectangular area enclosed by solid lines, the longer the vertical distance between the pixel and the reference point Cen, the longer the pixel is stretched in the horizontal direction. Therefore, the horizontal ratio parameter Wh would become larger. Similarly, the longer the horizontal distance between the pixel and the reference point Cen, the longer the pixel is stretched in the vertical direction. Thus, the vertical ratio parameter Wv would become larger.

Figure 5:
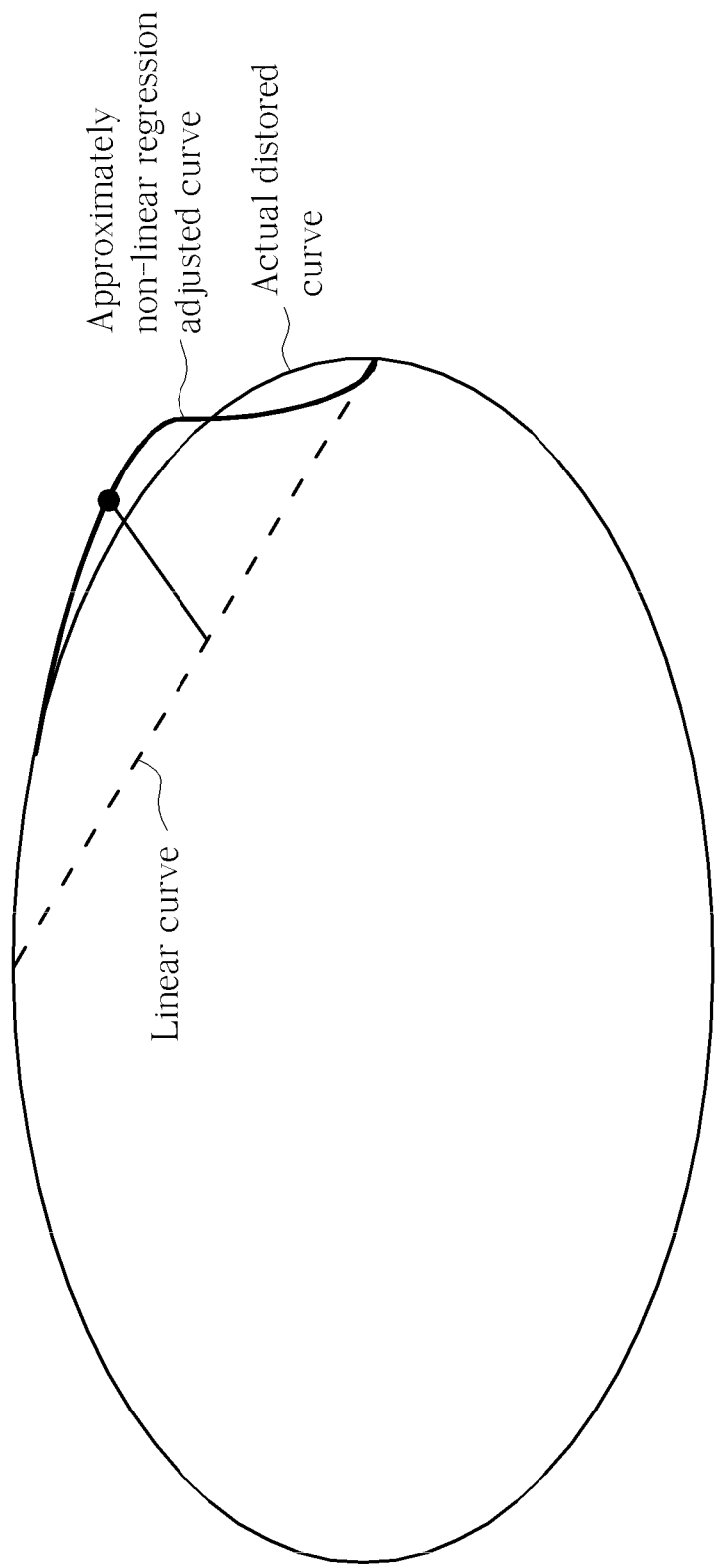
FIG. 5 is a schematic diagram illustrating a relationship between a linear curve, an actual curve and an approximately non-linear regression adjusted curve.

However, the diamond area shown in FIG. 4 is not an actual area of the distorted image. The actual distorted area should look like a near oval shape as shown in FIG. 5, and thus should not be formulated using linear functions. Therefore, non-linear regression calculations are needed to restore the diamond area in FIG. 4 to the near-oval-shaped area in FIG. 5. However, regarding the near-oval shape shown in FIG. 5, it would require complicated computations when performing non-linear regression calculations, and would have a high cost using either software or hardware implementation. Therefore, in step 306, the image processing unit 230 utilizes the horizontal ratio parameter Wh and the vertical ratio parameter Wv obtained in step 304, and a horizontal adjustment value Rh, a vertical adjustment value Rv, four exponential parameters p1, p2, q1, q2 entered by the engineer are used to fit an approximately non-linear regression curve in order to approach the actual distorted curve. Using the approximately non-linear regression to approach the actual distorted curve may decrease computations, i.e., replace the linear "curves" at fringes of the diamond-shaped area in FIG. 4 with curves after approximately non-linear regression adjustment in FIG. 5 (bold lines in FIG. 5), and further acquire relative position relationship between pixels of the original image and pixels of the corrected image. In detail, please refer to FIG. 6. Assuming that an area enclosed by dotted lines represents the original image data (i.e., the distorted image), and a rectangular area enclosed by solid lines represents the corrected image, in one embodiment, the relative position relationship between a pixel P2 of the original image and a pixel P1 of the corrected image may be represented using the following formulas:

$$m'=m+(Rh*Wh^{p1}*Wv^{q1});$$

$$n'=n+(Rv*Wv^{p2}*Wh^{q2});$$

where m, n, m', n' are horizontal and vertical coordinates of the pixel P1 and the pixel P2, respectively. In addition, when the horizontal ratio parameter Wh and the vertical ratio parameter Wv are substituted into the above formulas, the relative position relationship between a pixel P2 of the original image and a pixel P1 of the corrected image may be represented using the following formulas:

$$m'=m+(Rh*(\alpha dv+k1)^{p1}*(\beta dh+k2)^{q1});$$

$$n'=n+(Rv*(\beta dh+k2)^{p2}*(\alpha dv+k1)^{q2}).$$

The above mentioned formulas are only used for illustration of the relative position relationship between the pixel P2 of the original image and the pixel P1 of the corrected image, and not meant to be a limitation of the present invention. Besides, the order of calculations is not limited. That is, calculating (m, n) by first using (m', n') according to the above mentioned formulas is feasible. Since the number of pixels of the original image and the number of pixels of the corrected image may be different, one pixel of the original image may correspond to two pixels of the corrected image, or one pixel of the corrected image may require an interpolation of two pixels of the original image. Those skilled in the art should readily understand this calculation concept and method, detailed description is omitted here for brevity.

Figure 6:
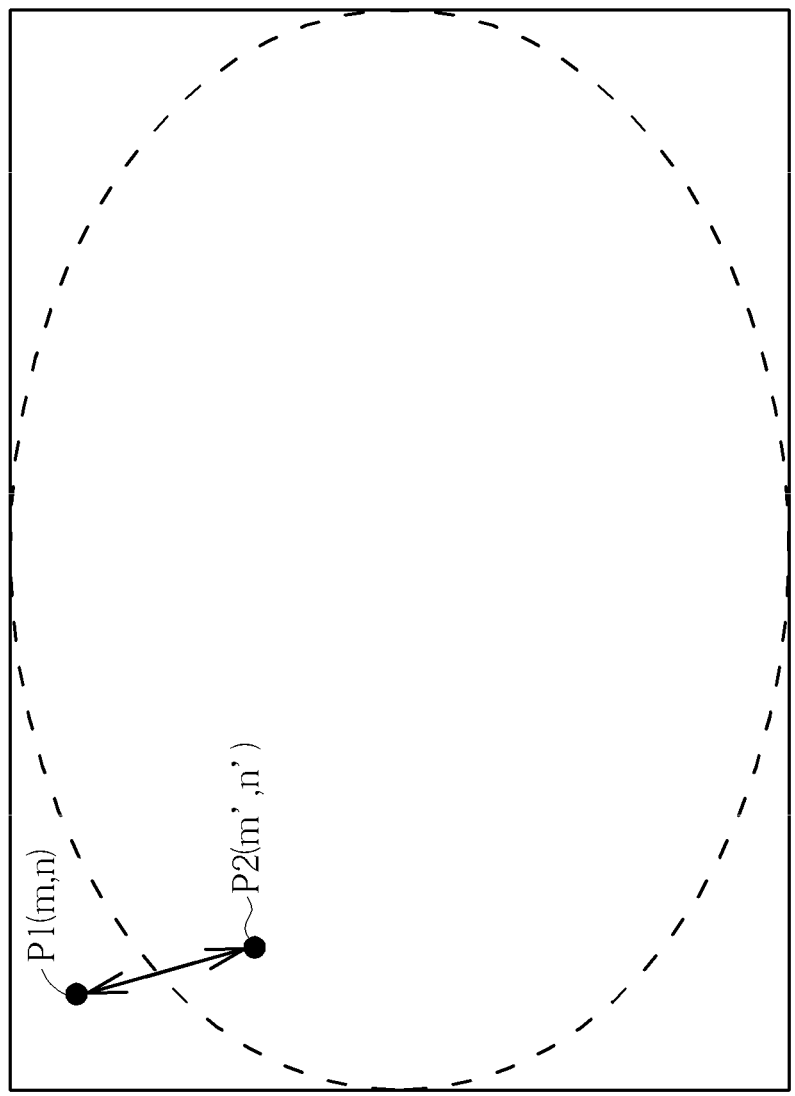
FIG. 6 is a schematic diagram illustrating a relative position relationship between a pixel of an original image and a pixel of a corrected image.

Referring to FIG. 6 and the above-mentioned formulas, it can be known that which pixel(s) of the original image data should be referenced to determine the pixel value of the corrected image. Therefore, in step 308, the relative position relationship between pixels of the original image and pixels of the corrected image is recorded in a look-up table in a backward wrapping manner. For example, assuming that the corrected image within the solid-line rectangular area in FIG. 6 has a resolution of 1280*960, the look-up table would have 1280*960 entries, in order to indicate locations of every pixels of corrected image in the original image (areas formed by dotted lines), thus providing access of locations in the original image for every pixels of the corrected image when following construction of the corrected image. It should be noted that recording in the backward wrapping manner may avoid black spots caused by forward wrapping employed in the prior arts from happening in the corrected image.

A complete look-up table would be obtained by performing above-mentioned calculations in steps 302-308 on every pixel.

In steps 302-308, since calculations are merely polynomial additions or multiplications and having no triangular functions or inverse functions as used in the prior arts, the computation process of the present invention would be much faster than that in the prior arts.

The above-mentioned steps 302-308 use a set of values, including a horizontal adjustment value Rh, a vertical adjustment value Rv and four exponential parameters p1, p2, q1, q2, to obtain the look-up table. In practice, an engineer would use a training mechanism to input multiple sets of the horizontal adjustment value Rh, the vertical adjustment value Rv and the four exponential parameters p1, p2, q1, q2, and repeat steps 302-308 to obtain multiple look-up tables. Next, the engineer would process an original image to obtain multiple corrected image according to these look-up tables, and then determine the quality of the corrected image (i.e., determine the difference between the corrected image and the recorded sample with the specific pattern) in order to decide an optimal look-up table and a best set of the horizontal adjustment value Rh, the vertical adjustment value Rv and the four exponential parameters p1, p2, q1, q2.

Figure 7:
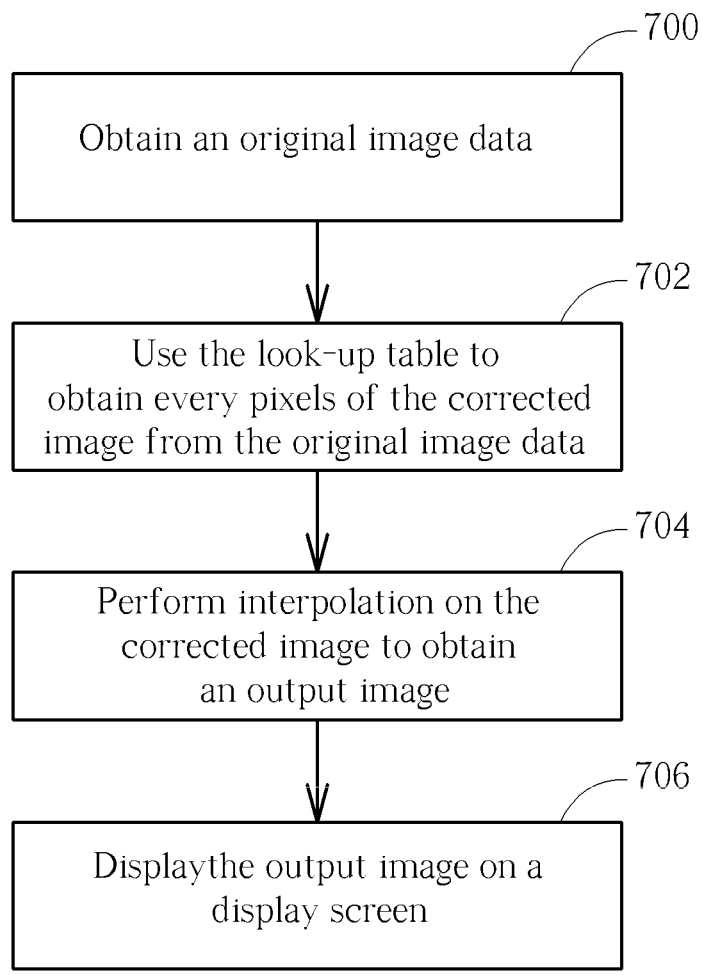
FIG. 7 is a schematic diagram illustrating image correction method according to an embodiment of the present invention.

Afterward, the optimal look-up table would be used in a driver or an application of an image capture/recording device for a user to use when the user is using the image capture/recording device. Please refer to FIG. 7, which is a schematic diagram illustrating an image correction method according to an embodiment of the present invention. As shown in FIG. 7, the image correction method is used in an image capture/recording device, and uses the flowchart in FIG. 3 to generate an optimal look-up table for image correction. The process shown in FIG. 7 is detailed as follows.

In step 700, the image capture/recording device is used to perform image capture/record to thereby obtain an original image data. Next, in step 702, the look-up table stored in the image capture/recording device is used to obtain every pixels of the corrected image from the original image data. Next, in step 704, the image capture/recording device performs bi-linear interpolation or other interpolations on the corrected image to mitigate sawtooth effects or discontinuities in an output image. Finally, in step 706, the output image is displayed on a display screen of the image capture/recording device.

Since the image capture/recording device at the user end may directly use the look-up table to obtain the corrected image, the loading of a CPU or other circuits in the image capture/recording device is very low, and thus it is possible for the image capture/recording device to achieve real-time processing (i.e., the refresh rate may achieve 30 frames per second). In addition, since step 302 calculates the horizontal ratio parameter Wh and the vertical ratio parameter Wv according to the horizontal distance and the vertical distance between the pixel and the reference point Cen, the corrected image generated via the look-up table according to the present invention would not lose horizontal FOV, so as to keep effects of the wide-angle lens/fish-eye lens.

Figure 8:
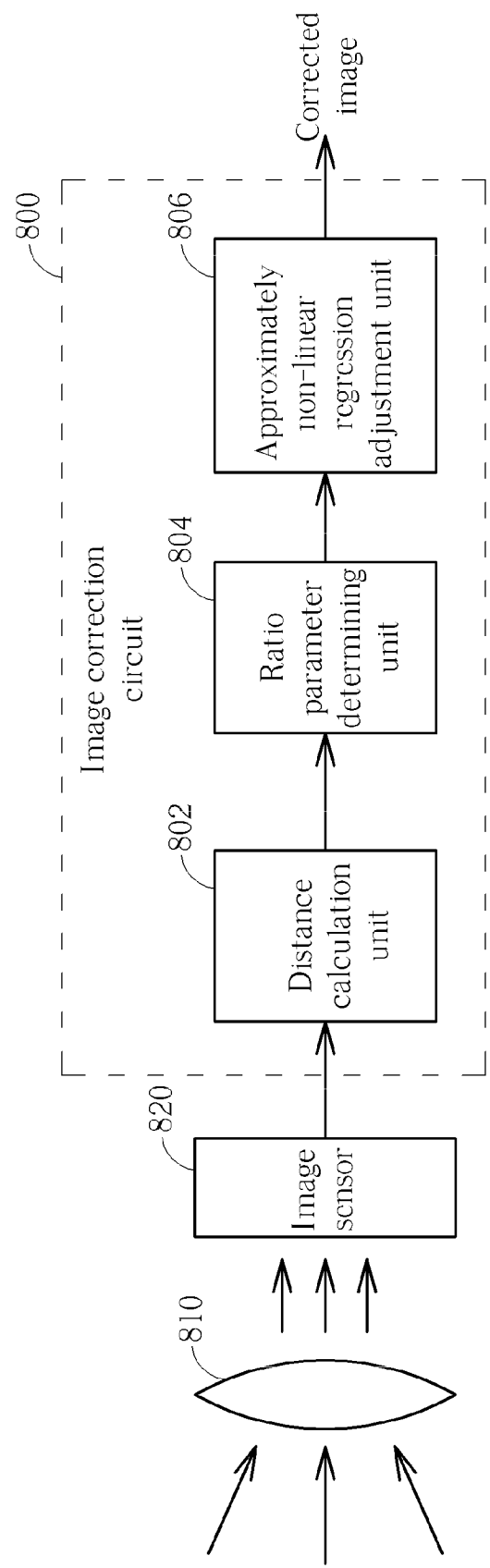
FIG. 8 is a schematic diagram illustrating an image correction circuit according to an embodiment of the present invention.

The above-mentioned embodiment generates a suitable look-up table when the image capture/recording device is still in factory. Hence, the built-in look-up table or a downloaded look-up table can be used to perform image correction when the user is using the image capture/recording device. In this way, the loading of the CPU is lowered. However, in another embodiment of present invention, the image capture/recording device employed by user may be directly equipped with an image correction circuit used to directly process a received original image data point-by-point, thus obtaining the corrected image without using any look-up table. In detail, please refer to FIG. 8, which is a schematic diagram illustrating an image correction circuit 800 according to an embodiment of the present invention. As shown in FIG. 8, the image correction circuit 800 is arranged to process an original image data to obtain a corrected image, and the image correction circuit 800 includes a distance calculation unit 802, a ratio parameter determining unit 804 and an approximately non-linear regression adjustment unit 806. In addition, the image correction circuit 800 is disposed in the image capture/recording device, e.g. a digital camera, a laptop with photo-shooting/video-recording functions, a mobile phone, a tablet, etc.

Operations of the image correction circuit 800 are similar to steps 302-306 as shown in FIG. 3. That is, the image sensor 820 records/captures images via lens 810, and transmits the captured original image data to the image correction circuit 800. The image correction circuit 800 processes each pixel in the original image data point-by-point. In detail, regarding each pixel, the distance calculation unit 802 calculates a horizontal distance and a vertical distance between the pixel and a reference point, where the reference point is a center point of the image data as shown in the embodiment in FIG. 4. Next, the ratio parameter determining unit 804 calculates a horizontal ratio parameter and a vertical ratio parameter according to the calculated horizontal distance and vertical distance between the pixel and the reference point, wherein the horizontal ratio parameter and the vertical ratio parameter represents the degrees of the pixel stretching outwards in the horizontal direction and the vertical direction, respectively. The horizontal ratio parameter Wh is in proportion to the vertical distance between the pixel and the reference point, and the vertical ratio parameter Wv is in proportion to the horizontal distance between the pixel and the reference point. Finally, the approximately non-linear regression adjustment unit 806 uses the horizontal ratio parameter Wh, vertical ratio parameter Wv, and built-in horizontal adjustment value Rh, vertical adjustment value Rv and four exponential parameters p1, p2, q1, q2 in the circuit to perform the approximately non-linear regression calculations to obtain locations of the pixels in the corrected image. After all the pixels are processed, the complete corrected image is obtained.

In the image correction circuit 800 as shown in FIG. 8, since the distance calculation unit 802, the ratio parameter determining unit 804 and the approximately non-linear regression adjustment unit 806 would not need to use triangular functions and inverse function in calculations, the circuit design may be relatively simple, and therefore saves design and manufacture cost. In addition, the image correction circuit 800 would not require a look-up table, and may spare/avoid a frame buffer device needed in the circuit, which further saves a lot of production cost.

Figure 9:
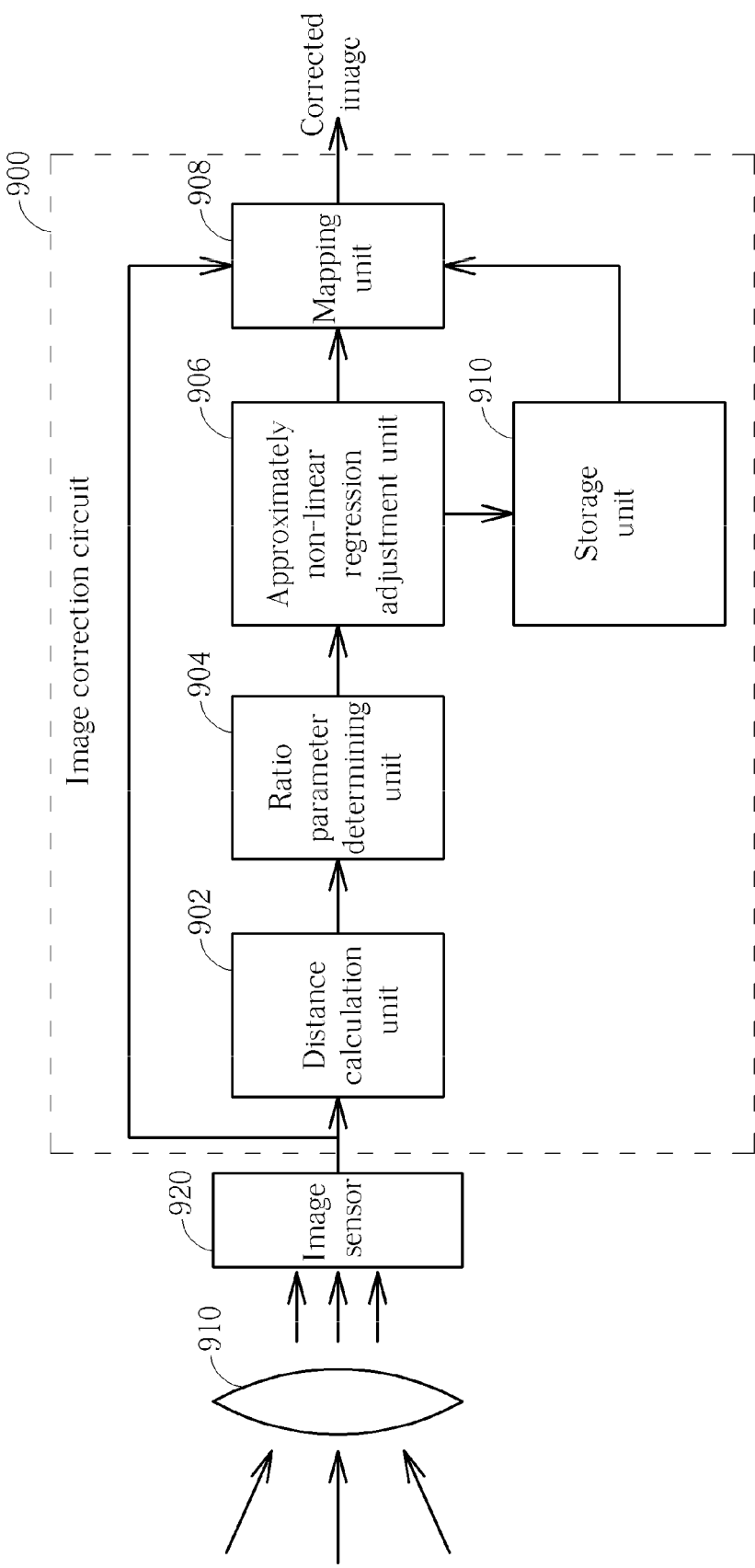
FIG. 9 is a schematic diagram illustrating an image correction circuit according to another embodiment of the present invention.

The image correction circuit 800 as shown in FIG. 8 is utilized for a user to perform on-line correction on captured image data. However, in another embodiment of the present invention, the image correction circuit may be used off-line, which is similar to the operation process shown in FIG. 3. To be more specifically, please refer to FIG. 9, which is a schematic diagram illustrating an image correction circuit 900 according to another embodiment of the present invention. As shown in FIG. 9, the image correction circuit 900 is arranged for processing an original image data in order to obtain a corrected image. The image correction circuit 900 includes a distance calculation unit 902, a ratio parameter determining unit 904, an approximately non-linear regression adjustment unit 906, a mapping unit 908 and a storage unit 910. In addition, the image correction circuit 900 is disposed in the image capture/recording device, such as a digital camera, a laptop with photo-shooting/video-recording functions, a mobile phone with photo-shooting/video-recording functions, a tablet with photo-shooting/video-recording functions, etc.

Regarding operations of the image correction circuit 900, it can be divided into an off-line part and an on-line part. Operations of the off-line part are similar to steps 302-308 as shown in FIG. 3. That is, the image sensor 920 captures images by the lens 910, and transmits captured original image data to the image correction circuit 900. The image correction circuit 900 processes each pixel in the original image data point-by-point. In detail, regarding each pixel, the distance calculation unit 902 calculates a horizontal distance and a vertical distance between each pixel and a reference point. Referring to the embodiment as shown in FIG. 4, the reference point is a center point of the image data. Next, the ratio parameter determining unit 904 calculates a horizontal ratio parameter and a vertical ratio parameter according to the calculated horizontal distance and vertical distance between each pixel and the reference point. The horizontal ratio parameter and the vertical ratio parameter represent the degree of the pixel stretching outwards in horizontal direction and vertical direction, respectively. In one embodiment, the horizontal ratio parameter is positively correlated with the vertical distance between each pixel and the reference point, and the vertical ratio parameter is positively correlated with horizontal distance between each pixel and the reference point. Next, the approximately non-linear regression adjustment unit 906 uses the horizontal ratio parameter, the vertical ratio parameter, and built-in horizontal adjustment value Rh, vertical adjustment value Rv, and four exponential parameters p1, p2, q1, q2 in the circuit to perform the approximately non-linear regression calculations to obtain a location of each pixel in the corrected image. Finally, the mapping unit 908 records relative position relationship between the pixels of the original image and the pixels of the corrected image into a look-up table in a backward wrapping manner. The look-up table is stored in the storage unit 910. The complete corrected image is obtained after the above-mentioned steps are performed on every pixel.

Regarding the above-mentioned operations of the image correction circuit 900, the image correction circuit 900 obtains the look-up table by using only one set of the horizontal adjustment value Rh, the vertical adjustment value Rv and the four exponential parameters p1, p2, q1, q2. In practice, an engineer would employ a training mechanism to input multiple sets of the horizontal adjustment value Rh, the vertical adjustment value Rv and the four exponential parameters p1, p2, q1, q2, and repeat the above-mentioned operations to obtain multiple look-up tables. Next, the engineer processes an original image to obtain multiple corrected images according to the multiple look-up tables, and then the engineer determines an optimal look-up table and a best set of the horizontal adjustment value Rh, the vertical adjustment value Rv and the four exponential parameters p1, p2, q1, q2 by determining/judging the quality of the corrected images (i.e., determining the difference between the corrected image and the recorded sample with the specific pattern).

Next, the optimal look-up table is employed in the image capture/recording device for a user to use when the user is using the image capture/recording device. At this moment, the image correction circuit 900 would perform operations of the on-line part. In detail, when the image correction circuit 900 performs operations of the on-line part, the distance calculation unit 902, the ratio parameter determining unit 904 and the approximately non-linear regression adjustment unit 906 would be all turned off, and the mapping unit 908 may use the optimal look-up table stored in the storage unit 910 to perform image correction operations on the original image data acquired by the image sensor 920, so as to generate the corrected image.

To conclude the present invention, in the image correction method and the image correction circuit of the present invention, a horizontal ratio parameter and a vertical ratio parameter is first determined according to a distance between each pixel and a reference point, and then a relationship of each pixel in the original image and the corrected image is determined by using an approximately non-linear regression adjustment method. The present invention would not need to use triangular functions or inverse functions in the calculations, and thus may perform the computations in a fast and efficient way. In addition, the corrected image generated by the present invention would not have losses in horizontal FOV, and thus can keep effects of the wide-angle lens/fish-eye lens.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image correction method, arranged for processing an original image to obtain a corrected image, wherein the original image is a non-rectangular-shaped image, and the corrected image is a rectangular-shaped image, and the image correction method comprising:
    receiving the original image from an image sensor;
    regarding each pixel of the original image, calculating a horizontal distance and a vertical distance between the pixel and a reference point in the original image;
    determining a horizontal ratio parameter and a vertical ratio parameter according to the horizontal distance and the vertical distance between the pixel and the reference point in the original image;
    performing an approximately non-linear regression calculation on the horizontal ratio parameter, the vertical ratio parameter and a coordinate of the pixel to obtain a position of the pixel in the corrected image; and
    determining a pixel value of the pixel of the corrected image by referring to a pixel value of the pixel of the original image.

2. The image correction method of claim 1, wherein the reference point is a center point of the original image.

3. The image correction method of claim 1, further comprising:
    recording a position of each pixel of the corrected image corresponding to the original image in a look-up-table in a backward-wrapping manner, wherein the look-up table is arranged to be used in a driver or an application of an image capture/recording device.

4. The image correction method of claim 1, wherein the horizontal ratio parameter is in proportion to the vertical distance between the pixel and the reference point, and the vertical ratio parameter is in proportion to the horizontal distance between the pixel and the reference point.

5. The image correction method of claim 1, wherein the step of performing the approximately non-linear regression calculation on the horizontal ratio parameter, the vertical ratio parameter and the coordinate of the pixel to obtain the position of the pixel in the corrected image comprises:
    calculating $(Rh*Wh^{p1}*Wv^{q1})$ as a horizontal distance difference between the pixel in the original image and the pixel in the corrected image; and
    calculating $(Rv*Wv^{p2}*Wh^{q2})$ as a vertical distance difference between the pixel in the original image and the pixel in the corrected image;
    wherein Rh is a horizontal adjustment value, Rv is a vertical adjustment value, Wh is the horizontal ratio parameter, Wv is the vertical ratio parameter, and p1, p2, q1, q2 are four exponential parameters.

6. The image correction method of claim 5, wherein Wh=$(\alpha dv+k1)$, and Wv=$(\beta dh+k2)$, where dh and dv are the horizontal distance and the vertical distance between the pixel and the reference point, respectively, and $\alpha$, $\beta$, k1, and k2 are constants.

7. An image correction circuit, arranged for processing an original image to obtain a corrected image, wherein the original image is a non-rectangular-shaped image, and the corrected image is a rectangular-shaped image, and the image correction circuit comprising:
    a distance calculation unit, wherein regarding each pixel of the original image, the distance calculating unit is arranged for calculating a horizontal distance and a vertical distance between the pixel and a reference point in the original image;
    a ratio parameter determining unit, coupled to the distance calculation unit and arranged for determining a horizontal ratio parameter and a vertical ratio parameter according to the horizontal distance and the vertical distance between the pixel and the reference point in the original image; and
    an approximately non-linear regression adjustment unit, coupled to the ratio parameter determining unit and arranged for performing an approximately non-linear regression calculation on the horizontal ratio parameter, the vertical ratio parameter and a coordinate of the pixel to obtain a position of the pixel in the corrected image, wherein a pixel value of the pixel of the corrected image is determined by referring to a pixel value of the pixel of the original image.

8. The image correction circuit of claim 7, wherein the reference point is a center point in the original image.

9. The image correction circuit of claim 7, further comprising:
    a storage unit, wherein the approximately non-linear regression adjustment unit records a position of each pixel of the corrected image corresponding to the original image in a look-up table in a backward-wrapping manner, and stores the look-up table in the storage unit.

10. The image correction circuit of claim 7, wherein the horizontal ratio parameter is in proportion to the vertical distance between the pixel and the reference point, and the vertical ratio parameter is in proportion to the horizontal distance between the pixel and the reference point.

11. The image correction circuit of claim 7, wherein the approximately non-linear regression adjustment unit calculation calculates $(Rh*Wh^{p1}*Wv^{q1})$ as a horizontal distance difference between the pixel in the original image and the pixel in the corrected image; and calculates $(Rv*Wv^{p2}*Wh^{q2})$ as a vertical distance difference between the pixel in the original image and the pixel in the corrected image, where Rh is a horizontal adjustment value, Rv is a vertical adjustment value, Wh is the horizontal ratio parameter, Wv is the vertical ratio parameter, and p1, p2, q1, q2 are four exponential parameters.

12. The image correction circuit of claim 11, wherein Wh=$(\alpha dv+k1)$ and Wv=$(\beta dh+k2)$, where dh and dv are the horizontal distance and the vertical distance between the pixel and the reference point, respectively, and $\alpha$, $\beta$, k1, and k2 are constants.

* * * * *